US010565884B2

(12) United States Patent
Bilek et al.

(10) Patent No.: US 10,565,884 B2
(45) Date of Patent: Feb. 18, 2020

(54) AUTOMATED SELECTION OF ENVIRONMENTAL DATA COVERAGE

(71) Applicant: Honeywell International Inc., Morris Plains, NJ (US)

(72) Inventors: Jan Bilek, Lovcicky (CZ); Zdenek Eichler, Olomouc (CZ); Karel Mundel, Vrane nad Vltavou (CZ)

(73) Assignee: Honeywell International Inc., Morris Plains, NJ (US)

( * ) Notice: Subject to any disclaimer, the term of this patent is extended or adjusted under 35 U.S.C. 154(b) by 241 days.

(21) Appl. No.: 15/688,756

(22) Filed: Aug. 28, 2017

(65) Prior Publication Data

US 2019/0066521 A1    Feb. 28, 2019

(51) Int. Cl.
| | | |
|---|---|---|
| *G06F 19/00* | (2018.01) | |
| *G06G 7/70* | (2006.01) | |
| *G06G 7/76* | (2006.01) | |
| *G08G 5/00* | (2006.01) | |
| *G01S 13/95* | (2006.01) | |
| *G01S 7/00* | (2006.01) | |

(52) U.S. Cl.
CPC .......... *G08G 5/0039* (2013.01); *G01S 13/951* (2013.01); *G01S 13/953* (2013.01); *G08G 5/0013* (2013.01); *G01S 7/003* (2013.01); *G08G 5/0052* (2013.01); *G08G 5/0091* (2013.01)

(58) Field of Classification Search
CPC ..... G01C 23/00; G01S 13/951; G01S 13/953; G01S 7/003; G08G 5/0013; G08G 5/0039; G08G 5/0052; G08G 5/0091
See application file for complete search history.

(56) References Cited

U.S. PATENT DOCUMENTS

| | | | |
|---|---|---|---|
| 6,828,922 B1 * | 12/2004 | Gremmert | G01S 7/003 340/949 |
| 7,587,733 B2 | 9/2009 | Keen et al. | |
| 8,054,214 B2 * | 11/2011 | Bunch | G01S 7/003 342/26 R |

(Continued)

FOREIGN PATENT DOCUMENTS

| | | |
|---|---|---|
| GB | 2 176 035 A | 12/1986 |
| GB | 2488916 A | 9/2012 |

OTHER PUBLICATIONS

Extended European Search Report dated Jan. 30, 2019 in European Application No. 18190867.4 (4 pages).

(Continued)

*Primary Examiner* — Harry Y Oh
(74) *Attorney, Agent, or Firm* — Bookoff McAndrews, PLLC

(57) ABSTRACT

A method for providing environmental data to a vehicle such as an aircraft is provided. The method includes receiving a request from a vehicle to provide environmental data, and defining a route plan vicinity area as a part of a coverage polygon. The method further includes receiving alternate/back-up destinations selected from a list and defining and including in the coverage polygon one or more connection areas between the route plan vicinity area and the selected alternate/back-up destinations. The method smooths the coverage polygon and assembles environmental data for the smoothed coverage polygon. The assembled environmental data is sent to the vehicle.

20 Claims, 7 Drawing Sheets

(56) References Cited

U.S. PATENT DOCUMENTS

| | | |
|---|---|---|
| 8,265,806 B2 | 9/2012 | Coulmeau et al. |
| 8,433,506 B2 | 4/2013 | Saggio, III et al. |
| 9,810,770 B1* | 11/2017 | Weichbrod ............ G01S 13/953 |
| 10,304,344 B2* | 5/2019 | Moravek .............. G08G 5/0039 |
| 2009/0043500 A1* | 2/2009 | Satoh ................ G01C 21/3461 |
| | | 701/414 |
| 2014/0253597 A1* | 9/2014 | Dohi ....................... G01W 1/02 |
| | | 345/656 |
| 2016/0209214 A1* | 7/2016 | Vasek .................... G01C 23/00 |
| 2017/0183105 A1* | 6/2017 | Fournier ................ B64D 45/00 |

OTHER PUBLICATIONS

Khatwa et al, "Threat Level Display for Weather Information", "U.S. Appl. No. 62/394,108, filed Sep. 13, 2016", Sep. 13, 2016, pp. 1-34, Published in: US.

* cited by examiner

AUTOMATED SELECTION OF ENVIRONMENTAL DATA COVERAGE

BACKGROUND

The most accurate and adequate in-flight decisions can be made if the pilot has up-to date environment information as provided over the Aeronautical Information Services/Meteorological Information Services (AIS/MET) Data Link. To have such information, a significant portion of data needs to be transmitted repeatedly from a ground station to an aircraft using a satellite data connection. The size of data directly affects the time and the cost for its transmission. Therefore, the pilot typically tries to reduce the data size by limiting either the number of products to be transmitted, or the coverage area.

The most significant savings without losing relevant information can be made if the data coverage is limited only for flight-affecting areas. To do so, the pilot has to select the area of interest (AOI). The application used by the pilot to make this selection needs to make compromises between offering (1) a simple interface to do the AOI selection fast and easy, or (2) a complex interface to perform the selection with precision to reduce the amount of data transmitted to the aircraft.

It might seem like an automatic process that selects the data coverage area to be limited to the flight path of the aircraft would provide a simple solution to this compromise in conventional applications. However, this process would not provide the pilot with sufficient information as other potential significant areas would be omitted from the data coverage area thereby increasing the risk to the aircraft, crew, passengers and cargo.

SUMMARY

One embodiment of the present invention is directed to a method for providing environmental data to a vehicle such as an aircraft. The method includes receiving a request from a vehicle to provide environmental data, and defining a route plan vicinity area as a part of a coverage polygon. The method further includes receiving alternate/back-up destinations selected from a list and defining and including in the coverage polygon one or more connection areas between the route plan vicinity area and the selected alternate/back-up destinations. The method smooths the coverage polygon and assembles environmental data for the smoothed coverage polygon. The assembled environmental data is sent to the vehicle. Other embodiments of systems and methods are shown and described.

BRIEF DESCRIPTION OF THE DRAWINGS

Embodiments of the present invention can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a system and process for precise, automated definition of a data coverage area (polygon) for providing environmental data tailored to a route plan of a vehicle, e.g., a flight plan of an aircraft or a shipping route for a boat or ship. For pedagogical purposes, the examples provided in the remaining portion of the specification are written in terms of a flight plan for an aircraft. However, it is understood that the teachings of the present specification are also applicable to other vehicles on the land, air or sea.

For purposes of this specification, the term environmental data includes, but is not limited to, meteorological or weather data, temporary flight restrictions, airspace status, or other such information concerning the route plan of the vehicle, e.g., flight plan of the aircraft. In embodiments of the present invention, the data coverage area is generated by starting with an area around the immediate route plan of the vehicle. Embodiments of the present invention further provide an automatic supplement to the reroute plan area by brining into the data coverage area, areas associated with alternate or backup destinations, e.g., airports, seaports, or other locations on land or at sea, along with connection areas between the route plan area and the areas associated with the alternate or back-up destinations. In some embodiments, manually selected areas are also added to the data coverage polygon. Further, the process smooths the resulting shape of the data coverage area (polygon) to prevent coverage related misinterpretations. This smoothing function removes narrow gaps and sharp angles in the resulting coverage polygon.

Figure 1:
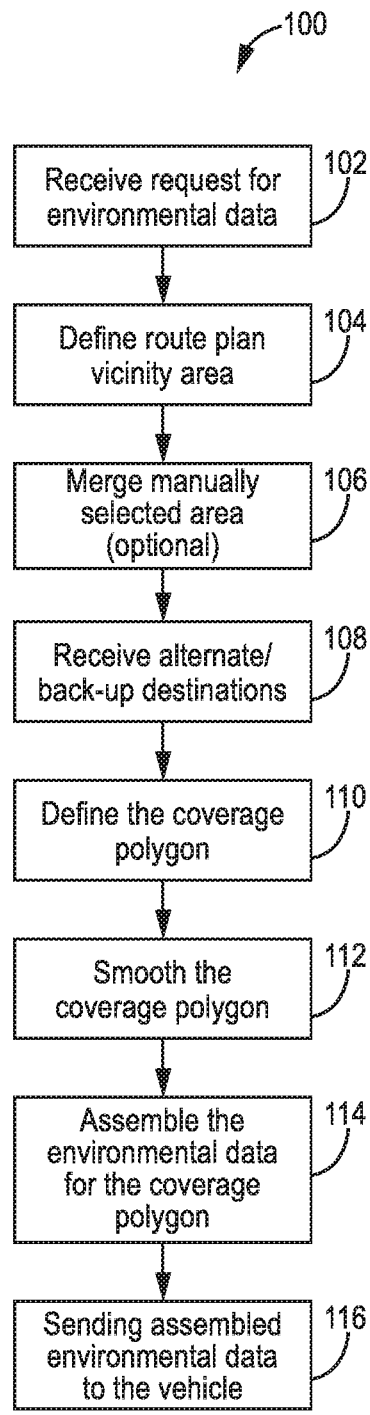
FIG. 1 is a flow chart of an embodiment of a process for automatic selection of a data coverage area for providing environmental data to a vehicle.

FIG. 1 is a flow chart of one embodiment of a method 100 for providing environmental data to a vehicle. Again, for pedagogical purposes, this example is given in terms of an aircraft. At block 102, the method receives a request from the aircraft for environmental data, e.g., weather or other meteorological data. In one embodiment, the request includes both flight plan information along with the selected data request. The request is received at a ground station, e.g., a ground data center (GDC).

The GDC computes the relevant data coverage area also known as the coverage polygon. In other embodiments the coverage polygon is determined on the vehicle or aircraft, such as described below with respect to FIGS. 4 and 5. In other embodiments, the various parts of the process for calculating the coverage polygon can be split between the vehicle and the data center.

Figure 3A:
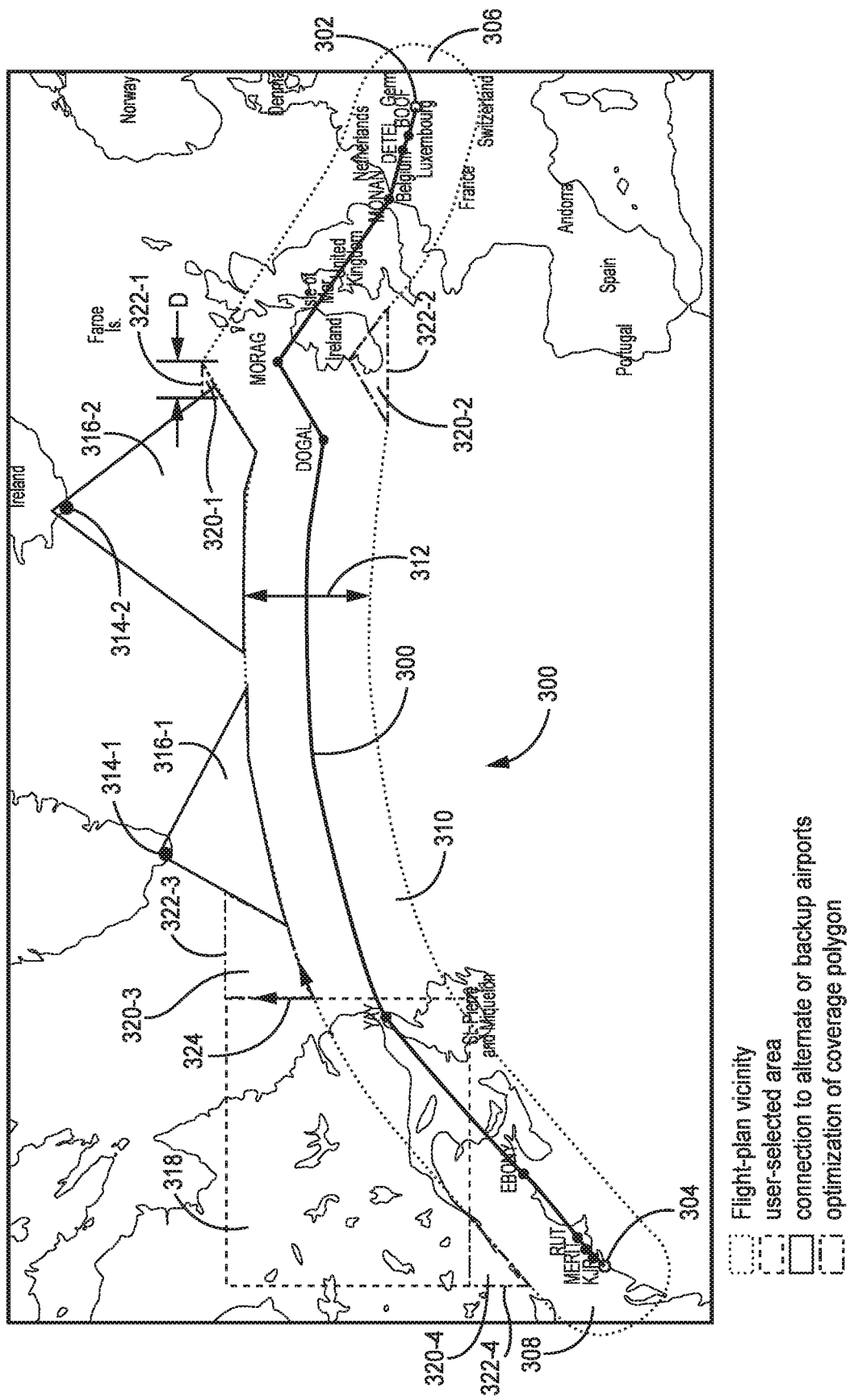
FIGS. 3A, 3B, and 3C are graphical representations of examples of data coverage areas generated according to the process of FIG. 1.

An example of a coverage polygon is coverage polygon 300 as shown in FIG. 3A. As an initial matter, method 100 begins with the route or flight plan received from the aircraft and defines a route or flight plan vicinity area at block 104 as the baseline for the coverage polygon. The flight plan vicinity area comprises a band along the planned trajectory and areas around the origin and destination airports. An example of a flight plan vicinity area is shown at 310 in FIG. 3A. Method 100 establishes the width of the flight plan vicinity area 310 in one of a number of ways. For example, the width of the flight plan vicinity area 310 may be one of the following:

(1) a static or constant distance from the trajectory, defined to cover the relevant environmental data along the path (see, e.g., flight plan vicinity area 310 having static width 312 in FIG. 3A.)

Figure 3B:
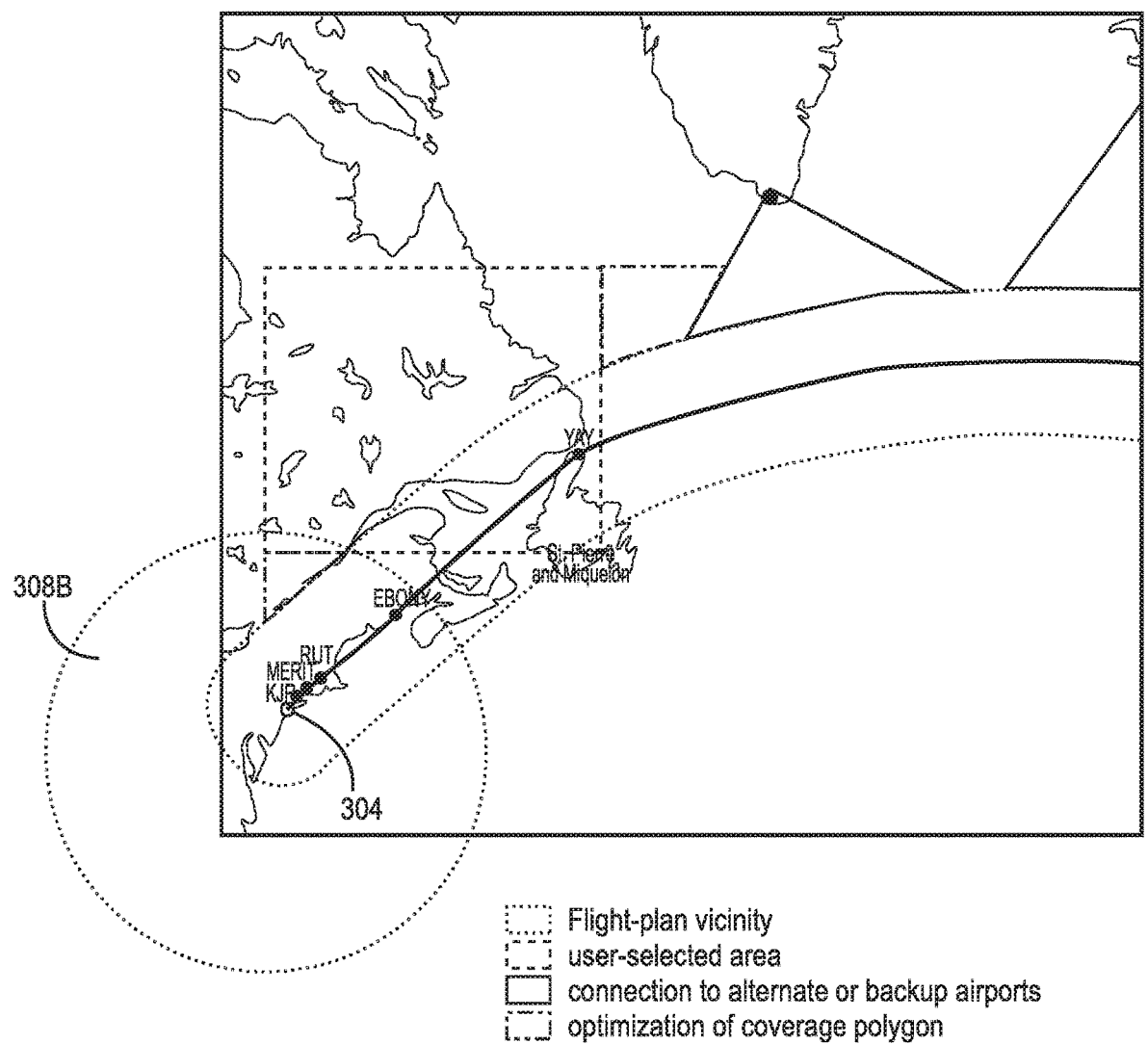
Figure 3C:
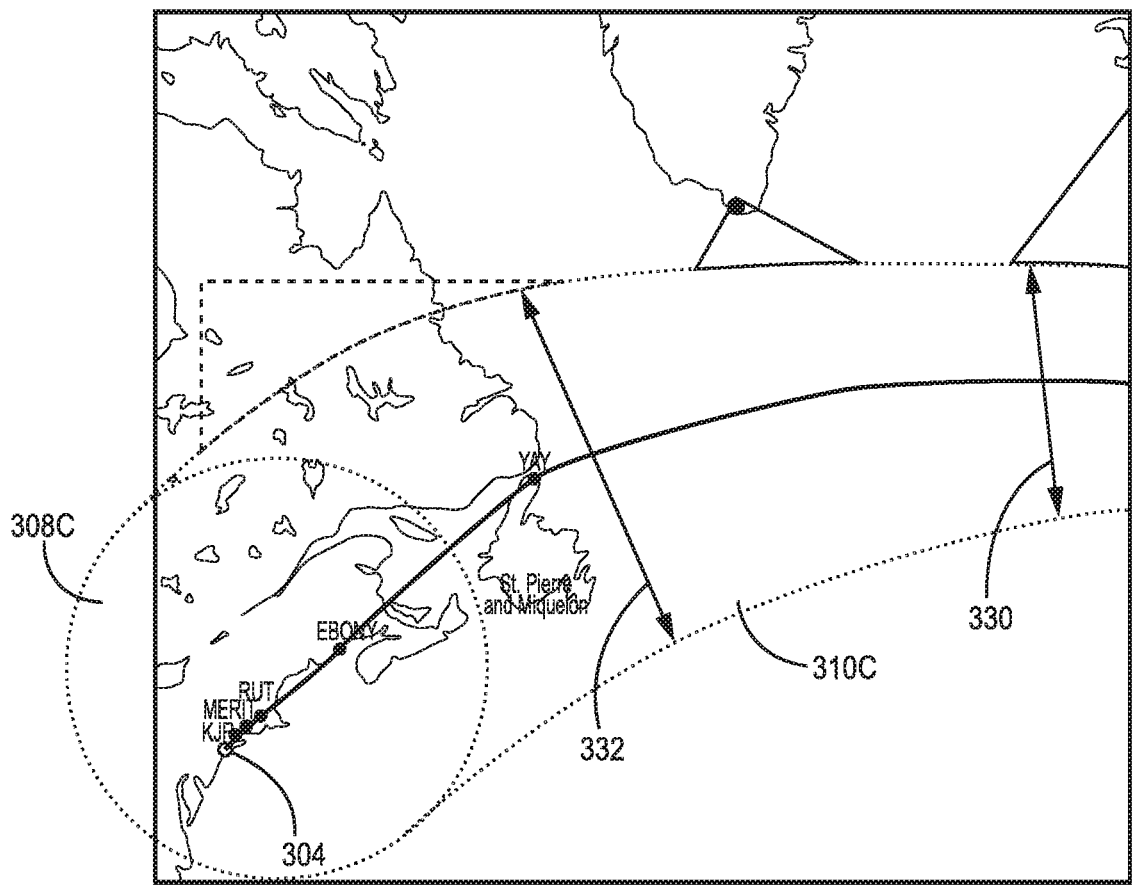

(2) a continuous increase of the band's width towards the destination to compensate for time delay along the path and the increased area of relevant environmental (meteorological) information resulting from this fact (e.g., flight plan vicinity area 310C having increasing width as shown by indicators 330 and 332 in FIG. 3C).

(3) a size defined by the aircraft type (identified in the data request), determined by the aircraft's performance and its specific needs.

The flight plan vicinity area also includes the areas around the origin airport and the destination airport. In one embodiment, as shown in FIG. 3A, these areas, 306 and 308, are simple circles that establish a zone for environmental data for the origin airport 302 and the destination airport 304, respectively. The size of the destination airport's zone can be increased to reflect the time related uncertainty of the development of weather and other environmental conditions. For example, as shown in FIG. 3B, the flight path vicinity area 310 includes an enlarged circular area 308B around destination airport 304.

At block 106, method 100 adds manually selected areas, if any, to the flight plan vicinity area of the developing coverage polygon. An example of a manually selected area is area 318 in FIG. 3A. Manual selection is performed by the pilot, or other flight crew member. In one embodiment, manually defined areas (either rectangles or more complex polygons) are transmitted as a part of a request for environmental data at block 102 and are simply merged with the automatically generated coverage polygon. The only necessary rule is that this merging of manually selected areas needs to happen prior to smoothing the coverage polygon as discussed in more detail below with respect to block 112.

At block 108, method 100 supplements the coverage polygon to account for back-up or alternate destination, such as back-up or destination airports, seaports or other appropriate destinations. In one embodiment, a predefined list of alternate/back-up airports is maintained at the ground station. The predefined list of alternate/backup airports is intended to be customizable per aircraft operator as a part of a subscription, thus allowing selection of relevant alternates based on the aircraft without the necessity of pilot's manual insertion of such information. Alternatively, in other embodiments, the alternate/backup choices are provided by the pilot or flight crew along with the flight plan information in the data request at block 102 based on a list of possible alternatives and back-ups stored on the aircraft. The route-specific selection is performed based on priorities set in the configuration list and the distribution of these airports along the trajectory.

In one embodiment, the following attributes are determined for each selected alternate/backup airport:

(1) Bearing to the airport from first viable deviation point along the flight plan.

(2) Bearing to airport from last viable deviation point along the flight plan.

(3) Relevancy distance behind the airport (can be determined with estimated time delay taken into consideration).

A triangular shape is constructed based on these attributes and the contained area is merged with the coverage polygon at block 110. For example, as shown in FIG. 3A, alternate or back-up airports 314-1 and 314-2 are selected as possible modification of the flight plan in route. Triangular connection areas 316-1 and 316-2 are added to cover possible flight paths to airports 314-1 and 314-2, respectively.

At block 112, method 100 smooths the coverage polygon. The coverage polygon has been created from the flight plan vicinity area, the manually selected area (if any), and the area associated with back-up/alternate airports and may contain narrow areas and small outer angles. To improve the environmental data provided to the vehicle, the coverage polygon is smoothed to remove these artifacts of the process by which it was created. In one embodiment, the smoothing process is based on two rules:

(1) Narrow areas that are adjacent to, but not-covered by, the coverage polygon are added into the coverage polygon. In one embodiment, a threshold is set, and, if a distance between covered areas does not exceed the threshold, the previously not-covered area is added to the coverage polygon.

(2) A second threshold is set for the size of outer angles of the coverage polygon. If an outer angle does not exceed this threshold, the area outside the coverage polygon at the angle is added to the coverage polygon.

In cases where it is possible, a new edge is added to the coverage polygon when these rules identify an area to add to the coverage polygon. For example, an edge is created with heading of 0°, 90°, 180° or 270° to correspond with geographical grid to encompass the previously excluded area. In other embodiments, edges are provided at other angles and orientations to smooth the shape of the coverage polygon as appropriate.

An example application of rule number (1) is illustrated by adding area 320-1 to the coverage polygon 300. The distance D between coverage area 316-2 and flight plan vicinity area 310 is less than the threshold distance. Therefore, area 320-1 is added to coverage polygon 300 with the addition of edge 322-1 that is oriented with a heading of ninety degrees. Similarly, application of this rule results in the addition of area 320-2 defined by the addition of edge 322-2.

An example of application of rule number (2) is illustrated by adding area 320-3 to coverage polygon 300. Angle 324 is less than the threshold set by method 100. Therefore the area adjacent to angle 324 (e.g., area 320-3) is pulled into coverage polygon 300 by the addition of edge 322-3. Similarly, area 320-4 is added to coverage polygon 300 by the addition of edge 322-4 due to an outer angle not exceeding the threshold.

At block 114, the requested environmental data (e.g., meteorological or weather data) is assembled for the area covered by the smoothed coverage polygon. The assembled environmental data is then transmitted to the vehicle such as an aircraft, e.g., over a satellite link, at block 116.

Method 100, described above with respect to FIGS. 1, 3A, 3B, and 3C, automates the generation of a coverage polygon in a manner that reduces user (e.g., pilot) interaction with the system and allows data size reduction by lowering irrelevant areas of data coverage. It is understood that the sequence of blocks in FIG. 1 may be altered from those described above. For example, blocks 104, 106 and 108 may be performed in any appropriate order so long as the smoothing function of block 112 is performed after at least the last of blocks 104, 106 and 108 is performed.

Advantageously, the described method offers efficient means for determining the coverage area for environmental data that maintains intuitiveness and that exhibits data efficiency and intelligibility. Specifically, in some embodiments, the method improves over prior systems by:

(1) Usage of an operator-customizable list of alternate/backup airports for data coverage definition.

(2) Inclusion of alternate/backup airports to the coverage area computation and definition of connection area with the planned trajectory.

(3) Smoothing the resulting polygon (including user-defined areas, if any) for intelligibility by removal of narrow or sharp-angled not-covered areas.

Figure 2:
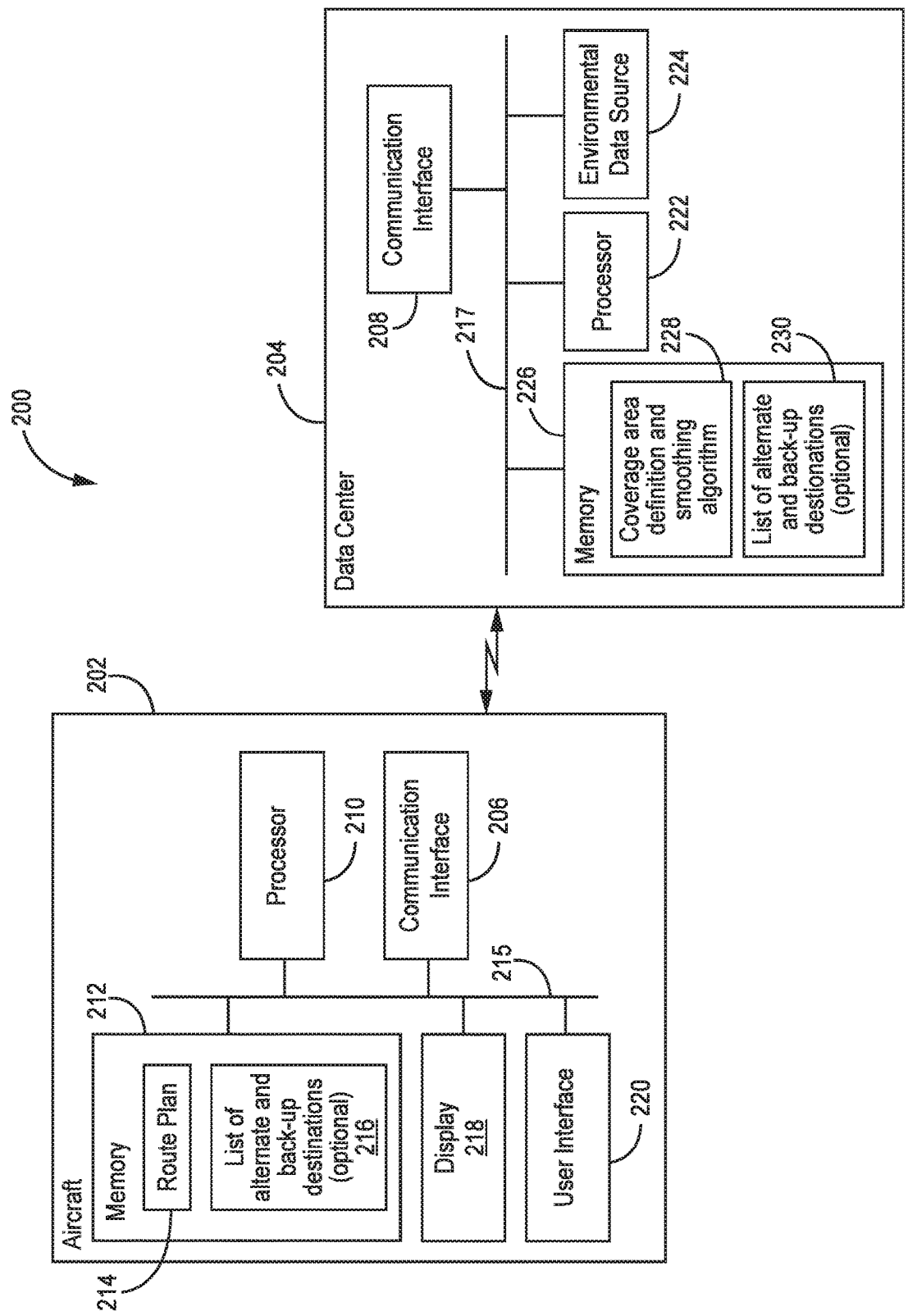
FIG. 2 is a block diagram of an embodiment of a system for automatic selection of a data coverage area for providing environmental data to a vehicle.

FIG. 2 is a block diagram of a system, indicated generally at 200, for automatic selection of a data coverage area for providing environmental data to an aircraft 202 using, for example, the method of FIG. 1. In other embodiments, aircraft 202 is replaced by a ship, or other appropriate vehicle. However, for simplicity, FIG. 2 is described in terms of providing environmental data to an aircraft. Aircraft 202 requests the environmental data from data center 204. Aircraft 202 includes a communication interface 206 for communicating with data center 204. Data center 204 also includes a communication interface 208. In one embodiment, communication interfaces 206 and 208 enable communication of data between aircraft 202 and data center 204 over, for example, a satellite data link.

Aircraft 202 includes several components that enable requesting and receiving environmental data according to the method of FIG. 1. For example, aircraft 202 includes a processor 210, memory 212, display 218 and user interface 220 that are interconnected using, for example, bus 215.

Processor 210 runs an application that enables a pilot to request environmental data from data center 204 for the current flight plan 214 stored in memory 212. In one embodiment, processor 210 also causes flight plan 214 to be displayed to the pilot on display 218. The pilot may identify additional areas for which the pilot would like to receive environmental data (so called manual selection). The pilot accomplishes this manual selection using interface 220 (e.g., keyboard, mouse, joy stick, touch screen or other appropriate interface). Additionally, processor 210 may cause a list of back-up or alternate airports to be displayed on display 218 for the pilot to select alternate or back-up airports or the pilot may directly type in the names of the airports. Alternatively, this selection may be made automatically at the data center 204. Processor 210 transmits the request for environmental data via communication interface 206 to data center 204. In one embodiment, this request just includes the request for environmental data along with the flight path 214. In other embodiments, the request includes one or more of: identified back-up or alternate airports, manually selected areas, and/or information on the type of aircraft.

Data center 204 includes several components that enable the generation of a coverage polygon for the requested environmental data according to the method of FIG. 1. For example, data center 204 includes processor 222, environmental data source 224 (for example, a weather or other meteorological database as well as databases that include information on temporary flight restrictions, airspace status, and other appropriate data concerning the environment of the planned route or flight path), and a memory 226 that are interconnected by bus 217.

Processor 222 runs an application, e.g., coverage area definition and smoothing algorithm 228, which enables generation of the coverage polygon using, for example, the method of FIG. 1 in response to a request from aircraft 202. Processor 222 receives the request from the aircraft via communication interface 208 and initiates generation of the coverage polygon based on the flight plan received with the request. Processor 222 further augments the coverage polygon based on a list of alternate or back-up airports as received with the request or from a list 230 stored in memory 226. Processor 222 also merges any manually selected areas identified in the request from aircraft 202. Further, processor 222 smooths the coverage polygon using, for example, the techniques described above. Processor 222 finally selects the appropriate meteorological or other environmental data for the coverage polygon from environmental data source 224 and sends that information to aircraft 202 via communication interface 208.

Figure 4:
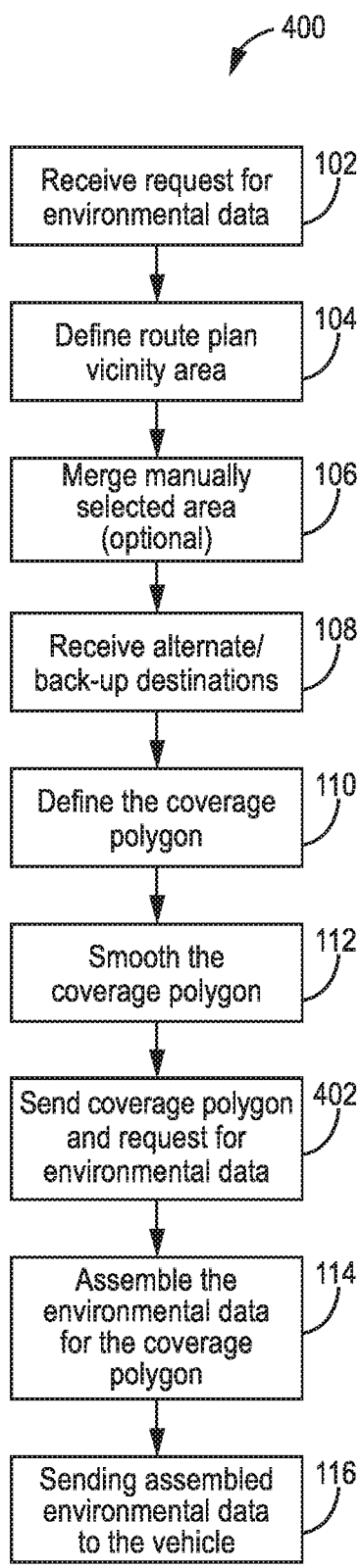
FIG. 4 is a flow chart of another embodiment of a process for automatic selection of a data coverage area for providing environmental data to a vehicle.

FIG. 4 is a flow chart of another embodiment of a process, indicated at 400, for automatic selection of a data coverage area for providing environmental data to a vehicle. This embodiment is similar to the embodiment described above with respect to FIG. 1. The main difference is that the embodiment of FIG. 1 is described in terms of the coverage polygon being generated in a data center. In other words, the functions of blocks 102, 104, 106, 108, 110, 112 are performed in the data center. In this embodiment, in contrast, these functions are performed in the vehicle itself. The vehicle, in this embodiment, generates the coverage polygon using the same blocks described above with respect to FIG. 1. Once the coverage polygon is generated, in this embodiment, a request for environmental data is sent to the data center at block 402. Included with this request is a description of the coverage polygon. As with the embodiment of FIG. 1, process 400 assembles the environmental data for the coverage polygon at block 114 and transmits the environmental data to the vehicle at block 116.

Figure 5:
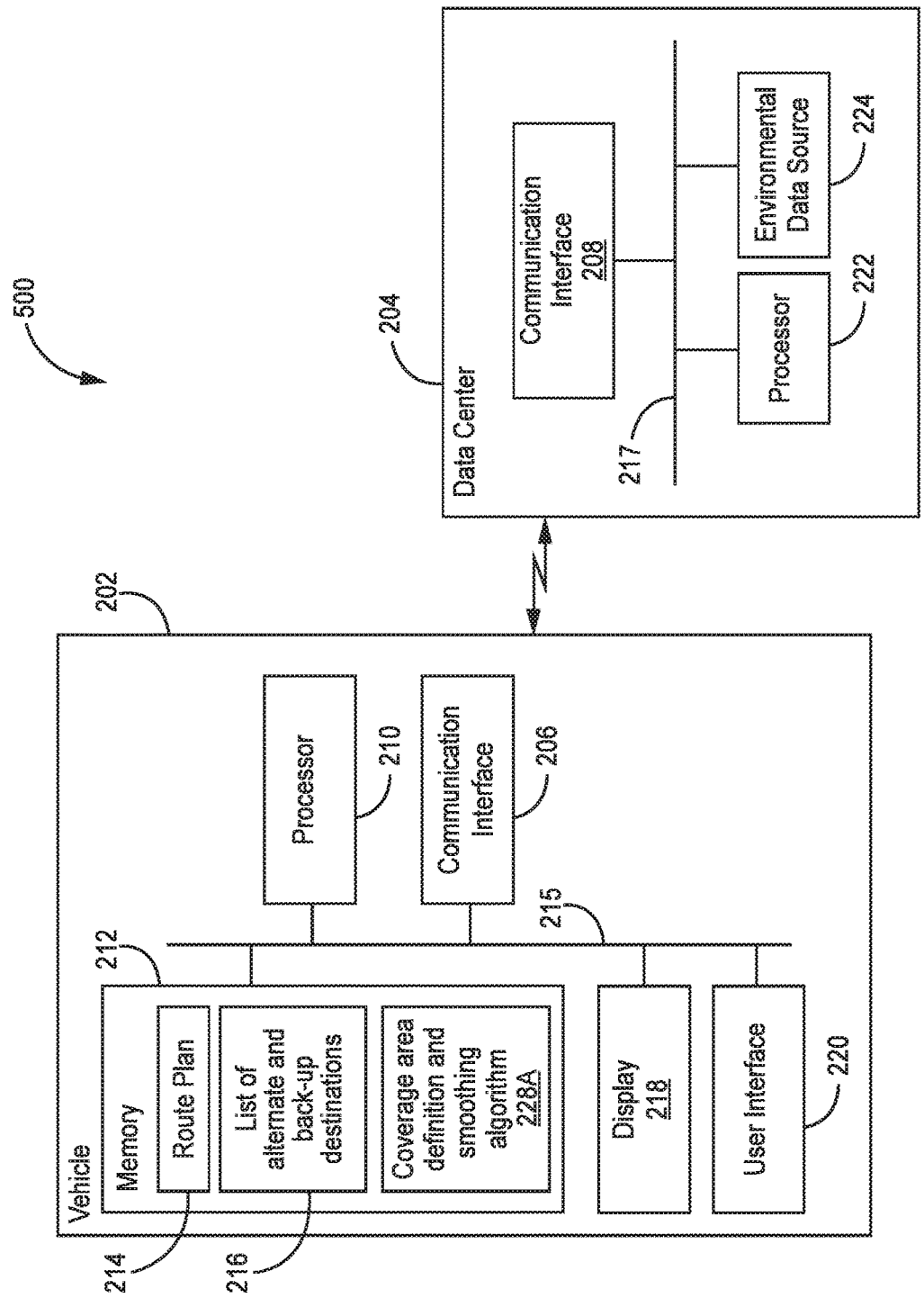
FIG. 5 is a block diagram of another embodiment of a system for automatic selection of a data coverage area for providing environmental data to a vehicle.

FIG. 5 is a block diagram of another embodiment of a system, indicated generally at 500, for automatic selection of a data coverage area for providing environmental data to a vehicle. System 500 differs from system 200 of FIG. 2 in that the coverage polygon in FIG. 5 is generated at vehicle 202 and transmitted to data center 204 as part of the request for environmental data. The coverage polygon, in this embodiment, is generated using coverage area definition and smoothing algorithm 228A stored in memory 212 of vehicle 202. Data center 204 receives the request for environmental data from vehicle 202 along with the coverage polygon. In response, data center assembles the environmental data for the vehicle 202 for the received coverage polygon and passes the environmental data to the vehicle 202.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a non-transitory storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Non-transitory storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

EXAMPLE EMBODIMENTS

Example 1 includes a method for providing environmental data to a vehicle, the method comprising: receiving a request from a vehicle to provide environmental data; defining a route plan vicinity area as a part of a coverage polygon; receiving alternate/back-up destinations selected from a list; defining and including in the coverage polygon one or more connection areas between the route plan vicinity area and the selected alternate/back-up destinations; smoothing the coverage polygon; assembling environmental data for the smoothed coverage polygon; and sending the assembled environmental data to the vehicle.

Example 2 includes the method of example 1, wherein receiving a request from a vehicle comprises receiving a request for one or more of meteorological data, airspace status, and temporary flight restrictions.

Example 3 includes the method of any of examples 1 and 2, wherein smoothing the coverage polygon comprises filling narrow gaps and smoothing sharp angles in the coverage polygon.

Example 4 includes the method of any of examples 1-3, wherein smoothing the coverage polygon comprises applying two rules to the coverage polygon: areas not covered by the coverage polygon are incorporated into the coverage polygon when a distance between coverage areas are separated by less than a selected distance; and outer angles of the coverage polygon that are below a selected value are replaced with an edge that is one of zero, ninety, one hundred eighty, and two hundred seventy degrees corresponding to a geographical grid.

Example 5 includes the method of any of examples 1-4, wherein selecting alternate/back-up destinations comprises automatically selecting alternate/back-up airports from a customized list based on an aircraft requesting the environmental data.

Example 6 includes the method of any of examples 1-5, and further comprising merging a manually selected area, if any, in the coverage polygon with the route plan vicinity area, wherein the manually selected area is received from an aircraft with the request for environmental data.

Example 7 includes the method of any of examples 1-6, wherein defining the route plan vicinity comprises establishing a band along a planned trajectory and areas around an origin airport and a destination airport, wherein the width of the band increases along the route plan from the origin airport to the destination airport.

Example 8 includes the method of any of examples 1-7, wherein defining the route plan vicinity comprises establishing a band along a planned trajectory and areas around an origin airport and a destination airport, wherein the size of the band is based on an aircraft type identified in the request for environmental data.

Example 9 includes the method of any of examples 1-8, wherein defining the route plan vicinity comprises establishing a band along a planned trajectory and areas around an origin airport and a destination airport, wherein the width of the band is substantially constant along the route plan from the origin airport to the destination airport.

Example 10 includes the method of example 9, wherein the area around the destination airport in the coverage polygon is larger than the area around the origin airport.

Example 11 includes a system for automatic generation of a coverage polygon, the system comprising: a communication interface configured to receive a request for environmental data from a vehicle; a source of environmental data; a processor, coupled to the communication interface and the source of environmental data, and configured to execute an application, wherein the application is operable to cause the system to execute a process for: receiving a request from a vehicle to provide environmental data; defining a route plan vicinity area as a part of a coverage polygon; merging a manually selected area, if any, in the coverage polygon with the route plan vicinity area; receive alternate/back-up destinations selected from a list; defining and including in the coverage polygon one or more connection areas between the route plan vicinity area and the selected alternate/back-up destinations; smoothing the coverage polygon; assembling environmental data for the smoothed coverage polygon; and sending the assembled environmental data to the vehicle.

Example 12 includes the system of example 11, wherein smoothing the coverage polygon comprises filling narrow gaps and smoothing sharp angles in the coverage polygon.

Example 13 includes the system of any of examples 11-12, wherein smoothing the coverage polygon comprises applying two rules to the coverage polygon: areas not covered by the coverage polygon are incorporated into the coverage polygon when a distance between coverage areas are separated by less than a selected distance; and outer angles of the coverage polygon that are below a selected value are replaced with an edge that is one of zero, ninety, one hundred eighty, and two hundred seventy degrees corresponding to a geographical grid.

Example 14 includes the system of any of examples 11-13, wherein selecting alternate/back-up destinations comprises automatically selecting alternate/back-up airports from a customized list based on an aircraft requesting the environmental data.

Example 15 includes the system of any of examples 11-14, wherein defining the route plan vicinity comprises establishing a band along a planned trajectory and areas around an origin airport and a destination airport.

Example 16 includes the system of any of examples 15, wherein establishing the band comprises establishing a band with a width that is one of substantially constant or increasing along the route plan from the origin airport to the destination airport and wherein the area around the destination airport in the coverage polygon is larger than the area around the origin airport.

Example 17 includes the system of any of examples 11-16, wherein defining the route plan vicinity comprises establishing a band along a planned trajectory and areas around an origin airport and a destination airport, wherein the size of the band is based on an aircraft type identified in the request for environmental data.

Example 18 includes a method for providing environmental data to a vehicle, the method comprising: receiving a request for environmental data; defining a route plan vicinity area as a part of a coverage polygon; identifying alternate/back-up destinations from a list; defining and including in the coverage polygon one or more connection areas between the route plan vicinity area and the selected alternate/back-up airports; smoothing the coverage polygon; sending the request for environmental data including the coverage polygon to a data center; and receiving assembled environmental data for the smoothed coverage polygon.

Example 19 includes the method of example 18, wherein smoothing the coverage polygon comprises filling narrow gaps and smoothing sharp angles in the coverage polygon.

Example 20 includes the method of any of examples 18-19, wherein smoothing the coverage polygon comprises applying two rules to the coverage polygon: areas not covered by the coverage polygon are incorporated into the coverage polygon when a distance between coverage areas are separated by less than a selected distance; and outer angles of the coverage polygon that are below a selected value are replaced with an edge that is one of zero, ninety, one hundred eighty, and two hundred seventy degrees corresponding to a geographical grid.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for providing environmental data to a vehicle, the method comprising:
   receiving, by a first processor, a request from a vehicle to provide environmental data;
   defining, by the first processor, a route plan vicinity area as a part of a coverage polygon;
   receiving, by the first processor, alternate/back-up destinations selected from a list;
   defining and including, by the first processor, in the coverage polygon one or more connection areas merged with the route plan vicinity area for the selected alternate/back-up destinations;
   smoothing, by the first processor, the coverage polygon;
   assembling, by the first processor, environmental data for the smoothed coverage polygon; and
   sending, by the first processor, the assembled environmental data to a second processor, the second processor being onboard the vehicle, for display of the assembled environmental data on a display of the vehicle.

2. The method of claim 1, wherein the receiving, by the first processor, a request from the vehicle comprises receiving, by the first processor, a request for one or more of meteorological data, airspace status, and temporary flight restrictions.

3. The method of claim 1, wherein smoothing, by the first processor, the coverage polygon comprises filling, by the first processor, narrow gaps and smoothing, by the processor, sharp angles in the coverage polygon.

4. The method of claim 1, wherein smoothing, by the first processor, the coverage polygon comprises applying, by the processor, two rules to the coverage polygon:
   areas not covered by the coverage polygon are incorporated into the coverage polygon when a distance between coverage areas are separated by less than a selected distance; and
   outer angles of the coverage polygon that are below a selected value are replaced with an edge that is one of zero, ninety, one hundred eighty, and two hundred seventy degrees corresponding to a geographical grid.

5. The method of claim 1, wherein selecting, by the first processor, alternate/back-up destinations comprises automatically selecting, by the first processor, alternate/back-up airports from a customized list based on an aircraft requesting the environmental data.

6. The method of claim 1, and further comprising merging, by the first processor, a manually selected area, if any, in the coverage polygon with the route plan vicinity area, wherein the manually selected area is received, by the first processor, from the vehicle with the request for environmental data.

7. The method of claim 1, wherein defining, by the first processor, the route plan vicinity comprises establishing, by the first processor, a band along a planned trajectory and areas around an origin airport and a destination airport, wherein the width of the band increases along the route plan from the origin airport to the destination airport.

8. The method of claim 1, wherein defining, by the first processor, the route plan vicinity comprises establishing, by the first processor, a band along a planned trajectory and areas around an origin airport and a destination airport, wherein the size of the band is based on an aircraft type identified in the request for environmental data.

9. The method of claim 1, wherein defining, by the first processor, the route plan vicinity comprises establishing, by the first processor, a band along a planned trajectory and areas around an origin airport and a destination airport, wherein the width of the band is substantially constant along the route plan from the origin airport to the destination airport.

10. The method of claim 9, wherein the area around the destination airport in the coverage polygon is larger than the area around the origin airport.

11. A system for automatic generation of a coverage polygon, the system comprising:
    a communication interface configured to receive a request for environmental data from a vehicle;
    a source of environmental data;
    a first processor, coupled to the communication interface and the source of environmental data, and configured to execute an application, wherein the application is configured to cause the system to execute a process for:
    receiving a request from a vehicle to provide environmental data;
    defining a route plan vicinity area as a part of a coverage polygon;
    merging a manually selected area, if any, in the coverage polygon with the route plan vicinity area;
    receiving alternate/back-up destinations selected from a list;
    defining and including in the coverage polygon one or more connection areas between the route plan vicinity area and the selected alternate/back-up destinations;
    smoothing the coverage polygon;
    assembling environmental data for the smoothed coverage polygon; and
    sending the assembled environmental data to a second processor, the second processor being onboard the vehicle, for display of the assembled environmental data on a display of the vehicle.

12. The system of claim 11, wherein smoothing the coverage polygon comprises filling narrow gaps and smoothing sharp angles in the coverage polygon.

13. The system of claim 11, wherein smoothing the coverage polygon comprises applying two rules to the coverage polygon:
- areas not covered by the coverage polygon are incorporated into the coverage polygon when a distance between coverage areas are separated by less than a selected distance; and
- outer angles of the coverage polygon that are below a selected value are replaced with an edge that is one of zero, ninety, one hundred eighty, and two hundred seventy degrees corresponding to a geographical grid.

14. The system of claim 11, wherein selecting alternate/back-up destinations comprises automatically selecting alternate/back-up airports from a customized list based on an aircraft requesting the environmental data.

15. The system of claim 11, wherein defining the route plan vicinity comprises establishing a band along a planned trajectory and areas around an origin airport and a destination airport.

16. The system of claim 15, wherein establishing the band comprises establishing a band with a width that is one of substantially constant or increasing along the route plan from the origin airport to the destination airport and wherein the area around the destination airport in the coverage polygon is larger than the area around the origin airport.

17. The system of claim 11, wherein defining the route plan vicinity comprises establishing a band along a planned trajectory and areas around an origin airport and a destination airport, wherein the size of the band is based on an aircraft type identified in the request for environmental data.

18. A method for providing environmental data to a vehicle, the method comprising:
- receiving, by a processor, a request for environmental data;
- defining, by the processor, a route plan vicinity area as a part of a coverage polygon;
- identifying, by the processor, alternate/back-up destinations from a list;
- defining and including, by the processor, in the coverage polygon one or more connection areas merged with the route plan vicinity area for the selected alternate/back-up airports;
- smoothing, by the processor, the coverage polygon;
- sending, by the processor, the request for environmental data including the coverage polygon to a data center;
- receiving, by the processor, assembled environmental data for the smoothed coverage polygon; and
- displaying, by the processor, the assembled environmental data for the smoothed coverage polygon on a display of the vehicle.

19. The method of claim 18, wherein smoothing, by the processor, the coverage polygon comprises filling, by the processor, narrow gaps and smoothing, by the processor, sharp angles in the coverage polygon.

20. The method of claim 18, wherein smoothing, by the processor, the coverage polygon comprises applying, by the processor, two rules to the coverage polygon:
- areas not covered by the coverage polygon are incorporated into the coverage polygon when a distance between coverage areas are separated by less than a selected distance; and
- outer angles of the coverage polygon that are below a selected value are replaced with an edge that is one of zero, ninety, one hundred eighty, and two hundred seventy degrees corresponding to a geographical grid.

* * * * *